United States Patent
Kapulnik et al.

[11] Patent Number: 5,728,300
[45] Date of Patent: Mar. 17, 1998

[54] PHYTORECOVERY OF METALS USING SEEDLINGS

[75] Inventors: Yoram Kapulnik, Highland Park, N.J.; Burt Ensley, Newtown, Pa.; Ilya Raskin, Manalapan, N.J.

[73] Assignee: Phytotech, Inc., Monmouth Junction, N.J.

[21] Appl. No.: 602,078

[22] Filed: Feb. 15, 1996

[51] Int. Cl.$^6$ .................................................. C02F 3/32
[52] U.S. Cl. .......................... 210/602; 210/620; 210/911
[58] Field of Search ................................ 210/602, 747, 210/610, 611, 620, 631, 911–913

[56] References Cited

U.S. PATENT DOCUMENTS

| | | | |
|---|---|---|---|
| D. 236,364 | 8/1975 | Fox | D35/3 A |
| 3,728,254 | 4/1973 | Carothers | 210/7 |
| 4,130,964 | 12/1978 | Caballero | 47/16 |
| 4,237,651 | 12/1980 | Caballero | 47/58 |
| 4,293,333 | 10/1981 | Drobot | 75/101 BE |
| 4,293,334 | 10/1981 | Drobot et al. | 75/101 BE |
| 4,310,990 | 1/1982 | Payne | 47/59 |
| 4,333,837 | 6/1982 | Plocz et al. | 210/602 |
| 4,678,582 | 7/1987 | Lavigne | 210/150 |
| 4,732,681 | 3/1988 | Galun et al. | 210/611 |
| 4,839,051 | 6/1989 | Higa | 210/602 |
| 4,872,985 | 10/1989 | Dinges | 210/602 |
| 4,904,386 | 2/1990 | Kickuth | 210/602 |
| 4,989,367 | 2/1991 | Chung | 47/61 |
| 5,000,852 | 3/1991 | Tel-Or et al. | 210/602 |
| 5,025,589 | 6/1991 | Park | 47/61 |
| 5,055,402 | 10/1991 | Greene et al. | 435/174 |
| 5,099,049 | 3/1992 | Chamberlain | 556/148 |
| 5,100,455 | 3/1992 | Pinckard et al. | 71/9 |
| 5,106,504 | 4/1992 | Murray | 210/602 |
| 5,120,441 | 6/1992 | Jackson et al. | 210/602 |
| 5,121,708 | 6/1992 | Nuttle | 119/3 |
| 5,129,936 | 7/1992 | Wilson | 71/63 |
| 5,156,741 | 10/1992 | Morrison et al. | 210/602 |
| 5,254,252 | 10/1993 | Drenner | 210/602 |
| 5,269,094 | 12/1993 | Wolverton et al. | 47/62 |
| 5,320,663 | 6/1994 | Cunningham | 75/432 |
| 5,337,516 | 8/1994 | Hondulas | 47/65 |
| 5,364,451 | 11/1994 | Raskin et al. | 210/602 |
| 5,393,426 | 2/1995 | Raskin et al. | 210/602 |

FOREIGN PATENT DOCUMENTS

| | | | |
|---|---|---|---|
| 277905 A1 | 4/1990 | Germany | C02F 3/32 |
| WO 94/01367 | 1/1994 | WIPO | C02F 3/32 |
| WO 94/29226 | 12/1994 | WIPO | C02F 3/32 |

OTHER PUBLICATIONS

Baker, A.J.M., et al., "Terrestrial Higher Plants Which Hyper-accumulate Metallic Elements—A Review of their Distribution, Ecology and Phytochemistry," *Biorecovery*, 1:81–126 (1989).

Baker, A.J.M., et al., "In Situ Decontamination of Heavy Metal Polluted Soils Using Crops of Metal-Accumulating Plants—A Feasibility Study," *In Situ Bioreclamation*, Hinchee et al. (eds.), pp. 600–605 (1991).

Boon, D.Y., et al., "Lead, Cadmium, and Zinc Contamination of Aspen Garden Soils and Vegetation," *Fert., Soils, Plant Nutr.*, 116:775 (1992) (Abstract 116:127679x).

(List continued on next page.)

*Primary Examiner*—Thomas G. Wyse
*Attorney, Agent, or Firm*—Marshall, O'Toole, Gerstein, Murray & Borun

[57] ABSTRACT

Methods and systems for alleviating the environmental and health hazards associated with environmental contamination by metals are provided. Contained living or non-viable biomasses of metal-accumulating plant seedlings deplete the metal elements and compounds in metal-containing aqueous solutions. Concomitantly, the contained biomasses of plant seedlings accumulate the metal elements and compounds. The energy and nutrient stores of the seeds from which the seedlings develop are exploited to minimize the costs of remediating the metal-containing aqueous solutions.

14 Claims, 9 Drawing Sheets

OTHER PUBLICATIONS

Chatterjee et al., "Comparison of the Immunological Properties of Mammalian (Rodent), Bird, Fish, Amphibian (Toad), and Invertebrate (Crab) Metallothioneins," *Mol. Cell. Biochem.*, 94:175–181 (1990).

Chigbo, F., et al., "Uptake of Arsenic, Cadmium, Lead and Mercury From Polluted Waters by the Water Hyacinth *Eichornia Crassipes*," *Environ. Pollution (Series A)*, 27:31–36 (1982).

Conley, L.M., et al., "An Assessment of the Root Zone Method of Wastewater Treatment," *J. Water Poll. Control Fed.*, 63:239–247 (May/Jun., 1991).

Dushenkov et al., "Phytoremediation Potential of Crop Plants," *Plant. Physiol.*, 105:43 (1994) (Abstract 185).

Estelle, M.A., et al., "The Mutants of Arabidopsis," *Trends in Genetics*, 2(4):89–93 (Apr., 1986).

Evans, K.M., et al., "Expression of the Pea Metallothionein-like Gene $PsMT_A$ in *Escherichia coli* and *Arabidopsis thaliana* and Analysis of Trace Metal Ion Accumulation: Implications for $PsMT_A$ Function," *Plant Mol. Biol.*, 20:1019–1028 (1992).

Haider, S.Z., "Mechanism of Absorption of Chemical Species from Aqueous Medium by Water Hyacinth and Prospects of its Utilization," 1984, United Nations Environment Program – Nairobi; Proceedings of the International Conference on Water Hyacinth, Hyderabad, India, pp. 41–57 (Feb. 7–11, 1983).

Jain et al., "*Azolla Pinnata* R.Br. and *Lemna Minor* L. For Removal of Lead and Zinc From Polluted Water," *Water Research*, 24(2):177–183 (1990).

Jackson et al., "Selection, Isolation, and Characterization of Cadmium–Resistant *Datura innoxia* Suspension Cultures," *Plant Physiol.*, 75:914–918 (1984).

Keefer, R.F., et al., "Chemical Composition of Vegetables Grown on an Agricultural Soil Amended with Sewage Sludges," *Biol. Abst. Toxicology*, 82(1):AB–1068 (1986) (Abstract 9330).

Keefer, R.F., "Chemical Composition of Vegetables Grown on an Agricultural Soil Amended with Sewage Sludges," *J. Environ. Qual.*, 15(2):146–152 (1986).

Lefebvre, "Expression of Mammalian Metallothionein Suppresses Glucosinolate Synthesis in *Brassica campestris*[1]," *Plant Physiol.*, 93:522–524 (1990).

Maiti et al., "Inheritance and Expression of the Mouse Metallothionein Gene in Tobacco," *Plant Physiol.*, 91:1020–1024 (1989).

McGrath, S.P., et al., "The Potential For The Use Of Metal–Accumulating Plants For The *In Situ* Decontamination Of Metal–Polluted Soils," *Soil Environ.*, 1:673–676 (1993).

Menser et al., "Elemental Composition of Common Ragweed and Pennsylvania Smartweed Spray–Irrigated with Municipal Sanitary Landfill Leachate," *Env. Pollution*, 18:87–95 (1979).

Meyerowitz, E.M., "*Arabidopsis Thaliana*," *Ann. Rev. Genet.*, 21:93–111 (1987).

Misra et al., "Heavy Metal Tolerant Transgenic *Brassica napus* L. and *Nicotiana tabacum* L. Plants," *Theor. Appl. Genet.*, 78:161–168 (1989).

Muramoto, S., et al., "Removal of Some Heavy Metals from Polluted Water by Water Hyacinth (*Eichornia crassipes*)," *Bull. Environm. Contam. Toxicol.*, 30:170–177 (1983).

Rauser, W. E., "Phytochelatins," *Ann. Rev. Biochem.*, 59:61–86 (1990).

Salt, D.E., et al., "Phytoremediation: A Novel Strategy for the Removal of Toxic Materials from the Environment Using Plants," *Bio/Technology*, 13:468–473 (May, 1995).

Stomp, A–M., et al., "Genetic Strategies for Enhancing Phytoremediation," *Ann. New York Acad. Sci.*, 721:481–491 (1994).

Stomp, A–M., et al., "Genetic Improvement of Tree Species for Remediation of Hazardous Wastes," *Biol. Abstracts*, 97(7):ABA–653 (1993) (Abstract 90191).

Treat et al., "An Inexpensive Chamber for Selecting and Maintaining Phototrophic Plant Cells," *Biotech. Techniques*, 3(2):91–94 (1989).

Vegetables, Encyclopedia of Vegetables, The American Horticultural Society Illustrated Encyclopedia of Gardening, p. 112 (1974).

Wolverton, B.C., "Aquatic Plants for Wastewater Treatment: An Overview", Aquatic Plants for Water Treatment and Resource Recovery, Magnolia Publishing, Inc., pp. 3–15 (1987).

Zambryski, P., "Basic Processes Underlying *Agrobacterium*–Mediated DNA Transfer To Plant Cells," *Ann. Rev. Genet.*, 22:1–30 (1988).

Zirschky et al., "The Use of Duckweed for Wastewater Treatment," *J. Water Pollution Control Fed.*, 60:1253–1258 (Jul., 1988).

PHYTORECOVERY OF METALS USING SEEDLINGS

FIELD OF THE INVENTION

The present invention relates generally to biological methods and systems for reducing the levels of polluting metals in metal-containing aqueous solutions. More particularly, the present invention relates to metal-accumulating plant seedlings and their use to remove metals, metalloids, and metal-containing compounds from metal-containing aqueous solutions.

BACKGROUND

Metals (ionic and elemental metals, metalloids, and metal-containing compounds) contained in terrestrial and aqueous environments have become an environmental pollution problem of increasing importance. The problem is particularly acute in areas surrounding metal processing industries, with the result that mine tailings, nuclear waste, and chemical byproducts containing appreciable quantities of metals cannot be freely discharged into the environment and similar materials already in the environment must be removed.

In the recent past, interest has focused on biological remediation processes, particularly plant-based remediation processes (i.e., phytoremediation), to deplete the metal content of environmental materials. For example, U.S. Pat. No. 4,732,681 reports the use of *Cladosporium cladosporioides* hyphal masses to remove lead, zinc, cadmium, nickel, copper and chromium from industrial effluents by adsorption to fungal surfaces. Precultured *C. cladosporioides* hyphae, present at 10 grams per liter of polluted water, were asserted to have lowered individual metal concentrations by approximately 0.5–1 order of magnitude. Conspicuous drawbacks to cost efficient operation of such systems, however, include the need to supply nutrients for growth of the heterotrophic fungi.

The water fern Azolla has also been noted to be capable of removing metal ions. U.S. Pat. No. 5,000,852 addresses the use of Azolla for rhizoid-mediated aqueous metal removal; treatment of contaminated solutions with comminuted Azolla is also reported. However, sunlight and nutrients must be provided to exploit Azolla. Satisfaction of these requirements typically limits the use of Azolla to the remediation of natural waterways where the water ferns receive adequate sunlight and nutrients.

Metal recovery by plants indigenous to wetlands (e.g., bulrushes, cattails, sedges, and reeds) has also been described. U.S. Pat. No. 5,337,516 reports, however, that these plants are most useful in removing organic pollutants. Aqueous metals in the soil are typically captured by the soil itself or chemically precipitated. Moreover, like Azolla, wetland plants require sunlight and nutrients. Wetland plants additionally require a wetland environment, resulting in a loss of land available for other uses.

Some true terrestrial plants have also been reported to extract metals from aqueous soil solutions. For example, WO 94/01367 recites the use of weeds (i.e., dogbane and ragweed) to extract lead from non-acidic soils. Mature *Arabidopsis thaliana*, another weed, has also been reported to accumulate metals. See, Baker et al., pages 600–605, at 602 in In Situ Bioreclamation (Hinchee et al. eds., 1991) (Baker et al. I). Weeds, however, require space, sunlight, and nutrients to grow. In addition, weed-based metal decontamination involves unsightly weed tracts and potentially elevated allergen levels.

An alternative to weed use for aqueous metal recovery involves extraction of metals by turf grasses (U.S. Pat. No. 5,393,426). These turf grasses have also been incorporated into a system for metal removal that involves solid support for the grasses, the system apparently being suitable for golf courses. Other approaches have exploited particular types of flowering plants. A survey of the Brassicaceae by McGrath et al., pages 673–676 in Integrated Soil and Sediment Research: A Basis for Proper Protection (Eijsackers et al. eds., 1993) revealed that some mature species may accumulate over 1000 ppm of Zn, Ni, or Cd. U.S. Pat. Nos. 5,364,451 and 5,393,426 also report the use of Brassica to recover metals. However, Baker et al. (I) reported that Brassica seedlings accumulated only trace quantities of metals. Additionally, each of these methods and systems requires sunlight, nutrients, space, and reliance on conventional agricultural practices of plant cultivation.

Stomp et al., *Ann. New York Acad. Sci.* 721:481–491 (1993), states that woody plants, augmented by a rhizosphere of root-associated bacteria and fungi, may be used for metal recovery. However, metal recovery by woody plants, like metal recovery by weeds, grasses, and flowering plants, requires costly space, sunlight, and nutrients.

Other approaches to metal removal abandon intact plants in favor of plant cells, living or dead. U.S. Pat. No. 5,120,441 reports that plant cell cultures of *Datura innoxia*, *Citrus citrus*, and Black Mexican Sweet Corn remove barium, iron, and plutonium ions from contaminated waters. U.S. Pat. Nos. 5,055,402 and 5,120,441 report the use of dead cells for the uptake of contaminating metals. Whether alive or dead when used, however, plant cells must be precultured. Energy and nutrients must be supplied to sustain such plant cell growth.

Of interest to the background of the invention are growth chambers for the commercial growth of mung bean sprouts for human consumption. U.S. Pat. No. 4,989,367 reveals an apparatus in which mung bean seeds are layered on water-permeable screens within a cylindrical chamber having entry and exit ports for both gas and liquid. The apparatus for growing mung beans revealed in U.S. Pat. No. 5,025,589 also vertically stratifies the sprouts by developmental age. In addition, U.S. Design Patent No. 236,364 portrays the use of circular screens for germinating plant seeds. All of these designs involve a predominantly gaseous environment within the growth chamber wherein water, soluble nutrients, and an energy source are provided.

There continues to exist a need in the art for improvements in phytoremediation methods and systems for removing metals from aqueous solutions. Such improved methods and systems would ideally involve minimization of the costly requirements of plants for energy and nutrients, and avoidance of the sequestration of inordinate areas of otherwise productive environmental resources.

SUMMARY OF THE INVENTION

The methods and systems of the invention satisfy the aforementioned need in the art by depleting the metals in metal-containing aqueous solutions through contact with a contained biomass of metal-accumulating plant seedlings that relies on the energy and nutrients stored in seeds and, thus, the methods and systems are not dependent on external sources of nutrients or energy in the form of light or heat prior to, or during, contact with the metal-containing aqueous solution.

One aspect of the present invention is directed to methods to effect a depletion of metal in a metal-containing solution and includes the following steps. A biomass forming step results in the formation of a contained biomass of metal-accumulating plant seedlings which does not require energy in the form of light (to promote photosynthesis) or heat (to achieve normal germination temperatures) prior to or during contact with a metal-containing aqueous solution. Another step in the method according to the invention is a contacting step wherein contact is effected between the contained biomass of plant seedlings and a metal-containing solution, preferably by contacting the entirety of the biomass, for a time period sufficient to permit accumulation of metals by the seedlings, with a corresponding depletion of metals from the solution. Preferred contacting means include immersion of the biomass in the metal-containing solution and spraying the metal-containing solution on the biomass. Yet another step in the method according to the invention is a separating step in which the contained biomass of plant seedlings, having accumulated metal from the metal-containing solution, are separated from that solution. In a preferred embodiment of the methods of the invention, a contained biomass suspended in an aqueous solution may be aerated during the formation and contacting steps, thereby associating, in particular, an aeration means with a contacting means. In another preferred embodiment, a contained biomass is mixed with a metal-containing solution during the contacting step, for example by mechanical agitation of a biomass-containing solution of metals or gaseous turbulence (i.e., spraying the biomass with the solution or fluidizing the biomass in an aerosol of the metal-containing solution), thereby associating a mixing means with a contacting means.

Other methods according to the invention use inviable or dead plant seedling biomasses to effect metal depletion of aqueous solutions. These methods involve a biomass formation step involving the development of viable seedlings. However, the biomass is rendered non-viable prior to the contacting and separating steps of the methods of the invention. These methods also avoid a requirement for external energy, in the form of light or heat, to produce the biomass of plant seedlings. In a preferred embodiment, etiolated seedlings, in the form of seedlings that have not been exposed to light wavelengths capable of promoting photosynthesis, are used.

The methods according to the invention contemplate use of seedlings germinated from seeds of metal-accumulating plant species including, but not limited to, *Brassica napus*, *Brassica rapa*, *Brassica juncea*, *Medicago sativa*, and *Oryzae sativa* for depletion of, e.g., the elemental and ionic forms of arsenic, lead, cadmium, cesium, chromium, cobalt, copper, manganese, nickel, selenium, strontium, uranium and zinc from aqueous solutions.

In the methods of the invention, seed germination for formation of the seedling biomass may be effected by disposing the plant seeds in a contained aqueous environment which may comprise the metal-containing solution from which metal is to be removed, resulting in temporal coincidence of the biomass forming and metal-containing solution contacting steps.

The contacting step of methods of the invention may involve continuous or discontinuous flowing of the metal-containing solution through the contained biomass, preferably by gravity. The metal-containing solution may be aerated during the contacting step.

Another aspect of the invention relates to systems to effect a depletion of metal in a metal-containing solution. A preferred system according to the invention includes chamber means containing a biomass of metal-accumulating plant seedlings and means for contacting the contained biomass of plant seedlings with the metal-containing solution. The biomass of metal-accumulating plant seedlings in the system does not require external nutrients or an external energy source in the form of light or heat prior to, or during, contact with the metal-containing solution. The means for contacting the biomass of metal-accumulating plant seedlings with the metal-containing solution typically includes, but is not limited to, an inlet means for continuous or discontinuous introduction of the solution into the chamber means and an outlet means for separating a metal-depleted solution from the contained biomass.

Chamber means within systems of the invention are preferably opaque to light. Opaque chambers permit the use of etiolated seedlings, a preferred biomass for use in systems according to the invention. These chamber means may provide for physical segregation of portions of the contained biomass of seedlings with, e.g., a plurality of porous screens. Moreover, systems according to the invention may be provided with a plurality of chamber means and interconnected contacting means allowing for continuous or discontinuous serial passage of the metal-containing solution through multiple seedling-containing chambers. When the system is implemented with a plurality of chambers, each chamber may contain a biomass of plant seedlings having a different capacity for accumulating metal. Such differences in metal-accumulating capacity may be due to differences in plant species of contained seedlings, differences in the quantities of seedlings in the chambers, or differences in maturity of seedlings of the same species. In a preferred embodiment of the systems according to the invention, the biomass-containing aqueous solution is mixed in the apparatus. In another preferred embodiment of the systems of the invention, the biomass-containing aqueous solution is aerated in the apparatus.

BRIEF DESCRIPTION OF THE DRAWINGS

Numerous other aspects and advantages of the present invention will be apparent upon consideration of the following detailed description, reference being made to the drawing wherein.

DETAILED DESCRIPTION

Figure 1A:
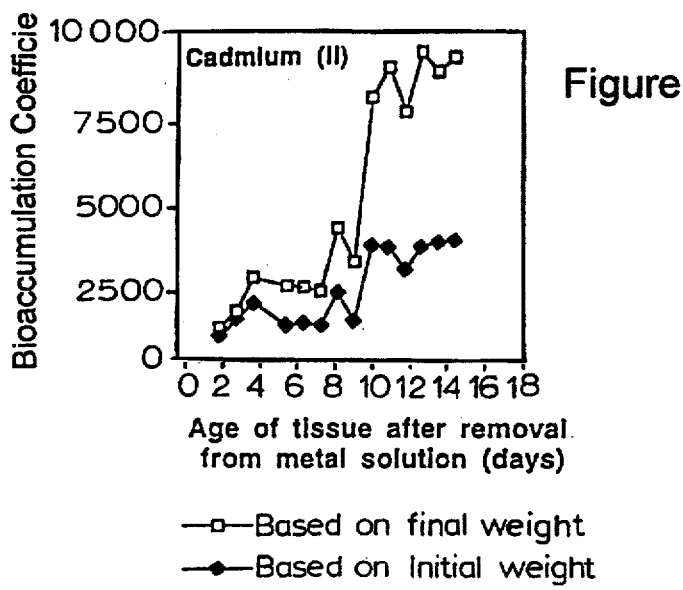
FIGS. 1A–1G and 2A–2O graphically depict the results of analytical procedures addressing the relationship between the developmental age of *Brassica juncea* (L.) Czern. seedlings and metal cation and anion accumulation, respectively.
Figure 1B:
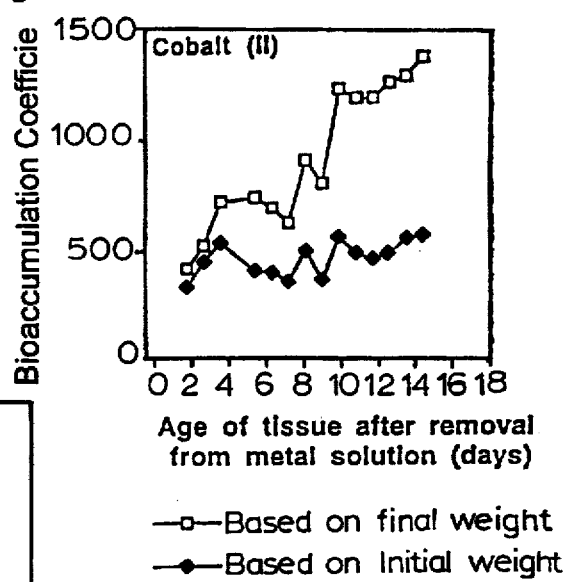
Figure 1C:
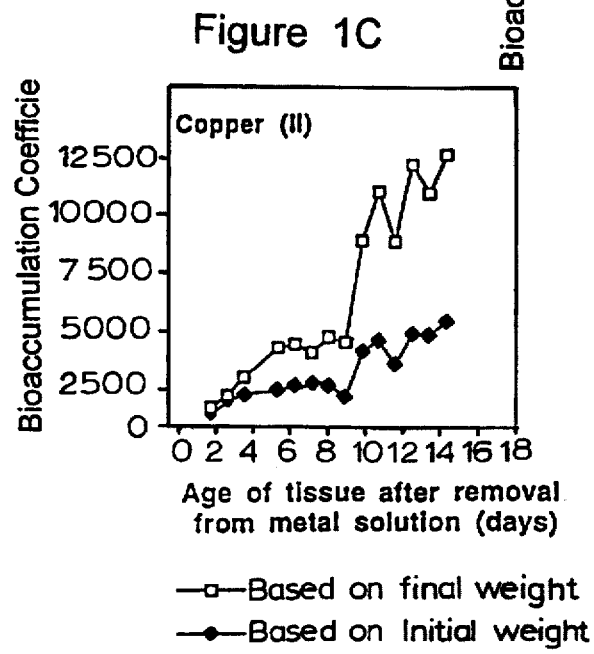
Figure 1D:
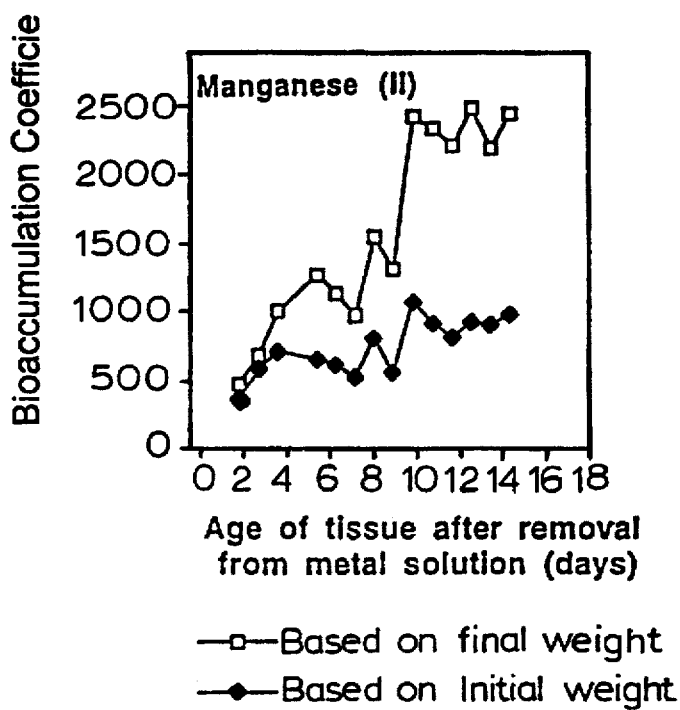
Figure 1E:
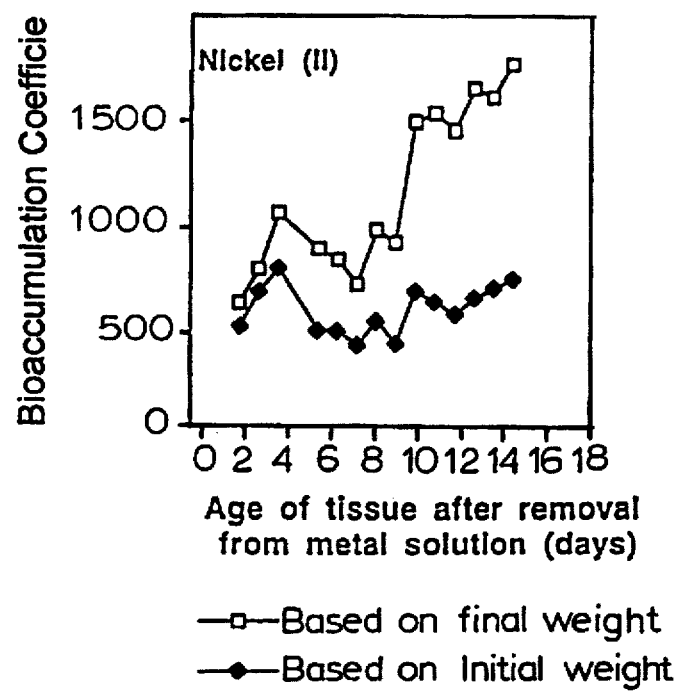
Figure 1F:
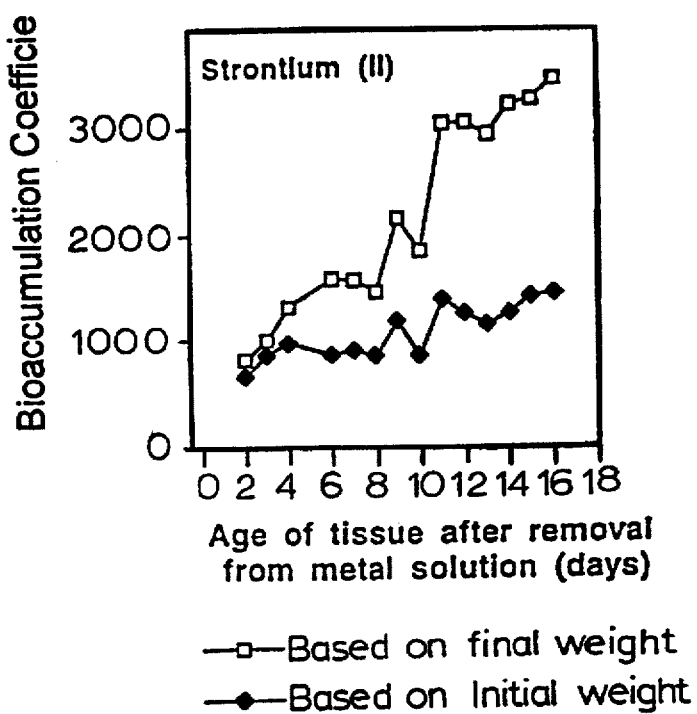
Figure 1G:
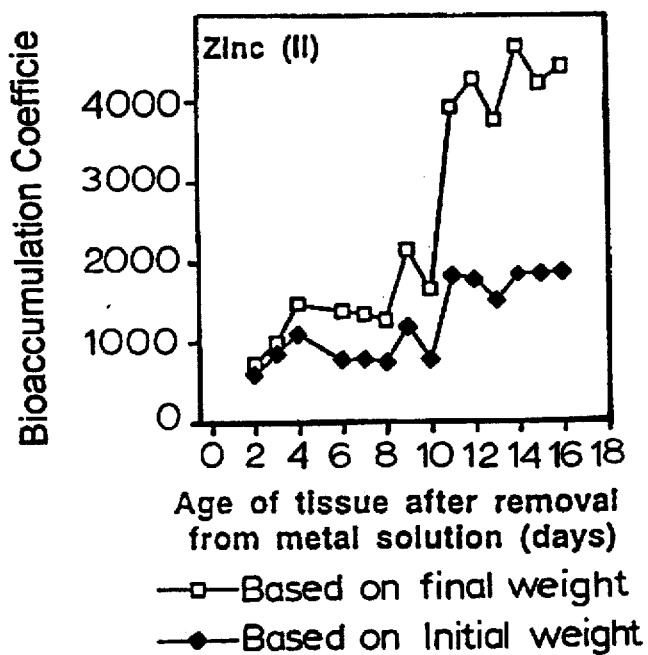

Numerous distinct advantages of practice of the present invention derive from the discovery that a compact, contained biomass of plant seedlings can effectively phytoremediate metal-containing solutions without requiring light, heat or external nutrients for the development of the biomass or for sustaining the biomass during periods of metal accumulation. The internal energy stores of seeds of metal-accumulating plants have been confirmed to be sufficient to support the development of a biomass of plant seedlings during periods prior to contacting a metal-containing solution and to sustain the biomass of plant seedlings during a period of contact with a metal-containing solution. Mixing of the metal-containing solution with the contained biomass of plant seedlings, for example to effect aeration, is contemplated by the invention. The absence of a requirement for energy input other than aeration provides manifest advantages in terms of cost reduction versus prior phytoremediation processes which require plant access to sunlight and/or provision of heat to the plants to achieve above-ambient temperatures. Another advantage of practice of the invention is that the contained biomass of plant seedlings employed therein is not dependent on an outside source for nutrients. Nutrients stored in the plant seeds support the development of the contained biomass of plant seedlings and sustain the contained biomass during a period of contact with a metal-containing solution. A substantial advantage expected from practice of the invention is that the biomass of seedlings will accumulate metal at least as efficiently as mature plants. Still another advantage of the methods and systems of the invention is the opportunity to develop a highly effective biomass of plant seedlings in minimal space. This space can be oriented vertically or horizontally. Before plants develop beyond the seedling stage and require additional space, the seedlings could have already been put to use for metal recovery and the biomass removed from containers, compacted, optionally dehydrated, and subjected to disposal. Such minimal requirements for space would allow for development of essentially portable, rather than permanent, system installations.

Exploitation of seed nutrients, together with exploitation of seed energy stores and lack of need for substantial illuminated growth space, allows a contained biomass of plant seedlings to accumulate metal within a compact space and without the need for costly supplements, thereby conferring advantages, in terms of flexibility and cost, on the present invention that are not enjoyed by known alternatives for the phytoremediation of metal-containing solutions. As described in detail hereafter, phytoremediation systems of the invention possess an inherent flexibility in application allowing for customized designs responsive to peculiarities in the metal content of solutions from which metal is to be depleted. For example, where metal content is so high that a single "pass" of contact with a seedling biomass is not sufficient to secure the desired level of metal depletion, serial passes through multiple "stages" of a contained seedling biomass can readily be effected by setting up a plurality of interconnected biomass chambers. In preferred embodiments, germination of seedlings in the several chambers is initiated at fixed intervals so that the solution to be treated can be serially placed in contact with seedling biomasses of the same developmental stages and metal accumulating efficiencies. Similarly, "stages" of phytoremediation chambers can be developed using seedlings having differing selectivities for the accumulation of one metal in preference to another, allowing for phytoremediative segregation of accumulated metals by first one, and then another, species of seedlings.

The following examples illustrate presently preferred embodiments of the invention. Example 1 illustrates the bioaccumulation of metal ions by etiolated $B.$ $juncea$ seedlings; Example 2 addresses the capacity of a variety of plant species seedlings to deplete several metals in a metal-containing aqueous solution; Example 3 illustrates the bioaccumulation of metals and metalloids by $B.$ $juncea$ seedlings exposed to metal contaminants in a tap water environment; Example 4 addresses removal of cadmium from an aqueous solution by $B.$ $juncea$ seedlings; Example 5 illustrates the bioaccumulation of metals and metalloids by inviable $B.$ $juncea$ seedlings; Example 6 describes a system exploiting seedlings to extract metals in an apparatus providing for the controlled flow of a metal-containing aqueous solution; Example 7 describes a system for seedling-mediated depletion of metal ions from metal-containing aqueous solutions flowing discontinuously through an apparatus according to the invention; Example 8 addresses an alternative metal depletion system employing immersed or submerged seedlings to extract metals from metal-containing aqueous solutions; Example 9 describes still another system for the depletion of metals from metal-containing aqueous solutions using seeds and seedlings in a fluidized bed apparatus; and Examples 10 and 11 address the genetic manipulation of plants to provide seedlings useful in practice of the invention.

EXAMPLE 1

Etiolated $Brassica$ $juncea$ seedlings were used to deplete the metal [cadmium (II), cobalt (II), copper (II), manganese (II), nickel (II), strontium (II), zinc (II), arsenic (III), chromium (III), and uranium (VI)] content of metal-containing aqueous solutions. Two hundred and fifty milligrams (mg) of $B.$ $juncea$ seeds previously stored in the dark were exposed to 800 milliliters (ml) of deionized water in a light-excluding 1 liter (1) plastic beaker (approximately pH 5.5) at 22°–25° C. The seed-containing aqueous composition was aerated using a sparging stone connected to a laboratory air pump, thereby mixing the composition. This process was repeated using similar materials on a daily basis for a total of 13 days. On every third day, the deionized water was exchanged for fresh deionized water. As a consequence, contained biomasses of progressively developed $B.$ $juncea$ seedlings were formed in 13 separate beakers. On day 14, seedlings at the various developmental stages were separately transferred to 13 large plastic tubs. Each tub contained 10 liters of a solution of metals as follows, with the final concentration of the relevant metal or metalloid in parentheses: $NaAsO_4$ (0.5 mg/l As), $Cd(NO_3)_2.4H_2O$ (0.1 mg/l Cd), $K_2Cr_2O_7$ (0.2 mg/l Cr), $Co(NO_3).6H_2O$ (0.5 mg/l Co), $Cu(NO_3)_2.3H_2O$ (0.5 mg/l Cu), $MnCl_2.4H_2O$ (3 mg/l Mn), $Ni(NO_3)_2.6H_2O$ (0.2 mg/l Ni), $NaSeO_4$ (0.5 mg/l Se), $SrCl_2.6H_2$) (0.5 mg/l Sr), $UO_2(C_2H_3O_3)_2$ (0.5 mg/l U), and $Zn(NO_3)_2.6H_2O$ (2 mg/l Zn). The pH of the solution of metals was approximately 5.0–5.5 prior to the addition of seedlings; the pH after incubation of the seedlings was approximately 5.0. Seedlings were incubated in the solution of metals with continuous aeration for 48 hours in the dark at a temperature of 22°–25° C. Each solution of metals was replaced with a fresh solution of metals after 24 hours.

After 48 hours total exposure to the metals, the seedlings at each developmental stage were separately removed and placed in paper envelopes. The envelopes were then incubated at 80° C. for 24–48 hours to dry the seedlings. Each collection of dried seedlings was then separately transferred to 50 ml glass digestion tubes and 5 ml of concentrated nitric acid was added to each tube. Samples were incubated at room temperature for 6 hours followed by 20 minutes at 180° C. After cooling, the samples were mixed with 1 ml of concentrated perchloric acid and incubated for another 20 minutes at 180° C. Deionized water was then added to bring each sample to a final volume of 25 ml. Subsequently, each sample was analyzed by inductively-coupled plasma spectroscopy using a Fisons Accuris E system. (Fisons Instruments, Beverly, Mass).

Figure 2A:
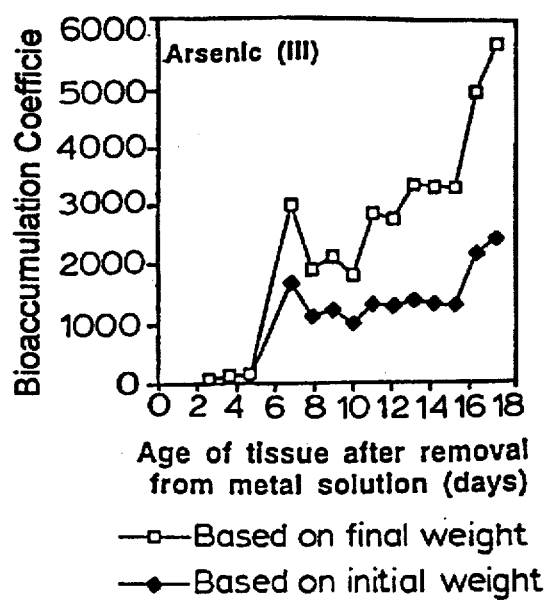
Figure 2B:
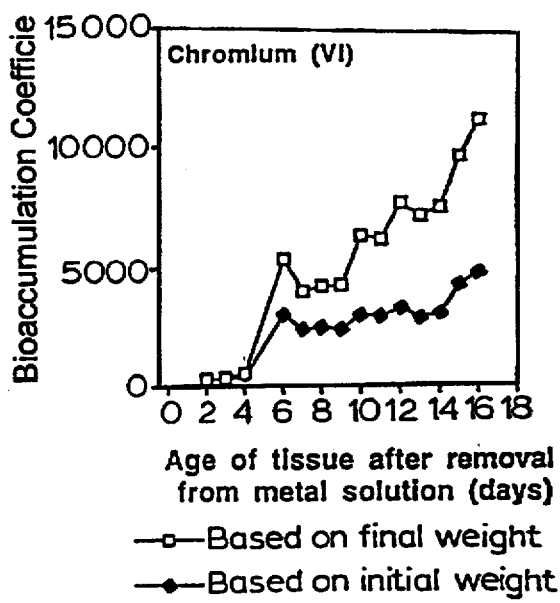
Figure 2C:
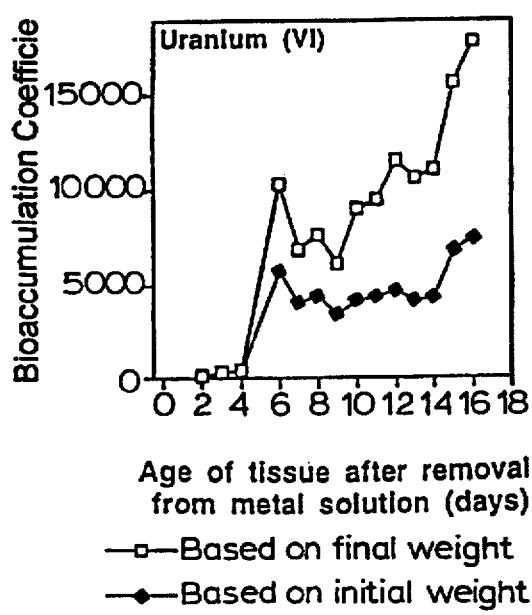
Figure 3:
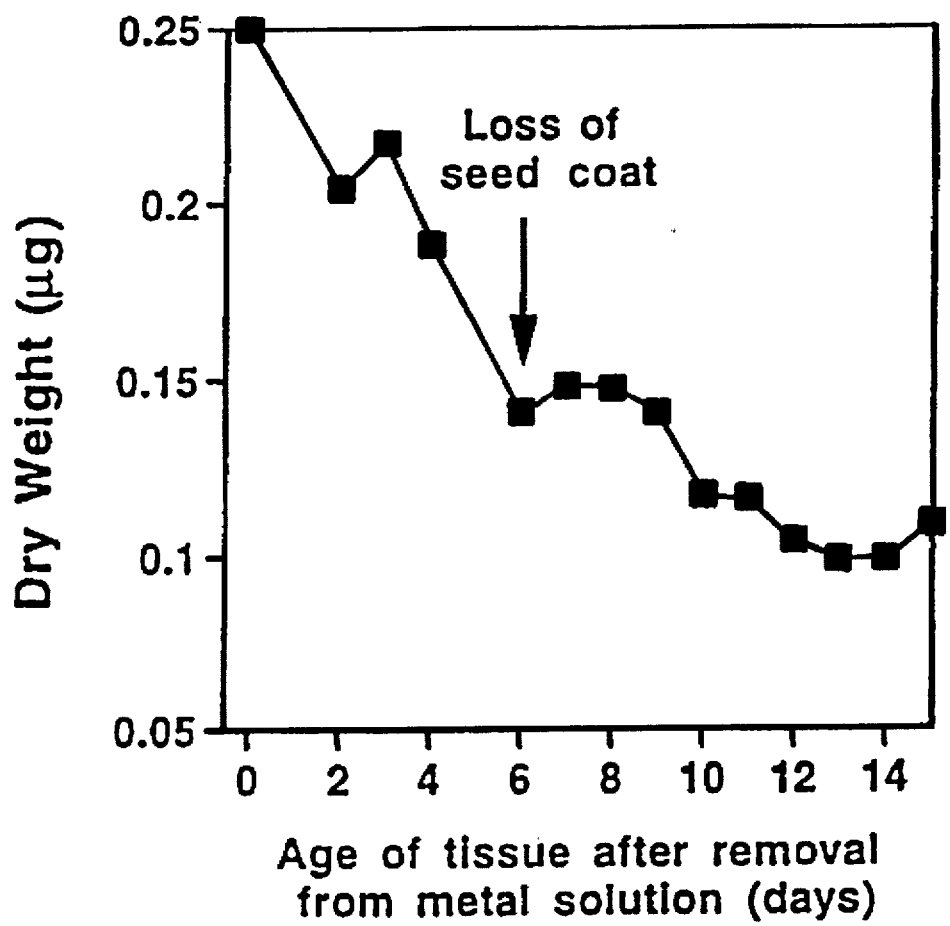
FIG. 3 graphically illustrates the results of analytical procedures addressing the relationship between *B. juncea* tissue age and weight loss.

The test results are graphically depicted in FIGS. 1A–1G. The bioaccumulation coefficient shown is defined as the ratio of metal concentration in seedling tissue (micrograms per gram, µg/g) to the initial metal concentration in solution (mg/l). [A bioaccumulation coefficient B is defined as B=X/Y, where X=mass of metal in seedlings (µg)/seedling mass (g) , and Y=mass of metal in solution (mg)/volume of solution (I). Thus, X provides a measure of the concentration of metal in seedlings and Y provides a measure of the concentration of metal in solution]. The independent variable is tissue age, defined as the time from initial wetting of the B. juncea seeds until harvest from the solution of metals. Etiolated B. juncea seedlings of increasing age and development accumulated increasing quantities of each of the seven metal cations—cadmium, cobalt, copper, manganese, nickel, strontium, and zinc. This result held true whether the accumulation of metal was determined as a function of the wet or dry weight of the seedlings. Similarly, the results shown in FIGS. 2A–2C demonstrate that seedlings of increasing age and development accumulated increasing quantities of anionic metals. Again, the conclusion was not dependent on the measure (wet or dry) used for the seedling weight. Moreover, FIG. 3 shows that with increasing developmental age the B. juncea seedlings exhibited an approximately 60% loss in dry weight, facilitating the economical final recovery of metal from the biomass.

Preferred for use in the present invention are seedlings from the Brassicaceae family of plants. The Brassicaceae constitute a plant family with several members exhibiting a capacity for metal accumulation. For example, *Brassica juncea* (L.) Czern. (mustard) seedlings are capable of accumulating metals. Other preferred members of the Brassicaceae include, but are not limited to, *B. carinata* Braun (Ethiopian mustard), *B. oleracea* (L.) (cole crops), *B. nigra* (L.) Koch (black mustard), *B. campestris* (L.) (turnip rape), *B. napus* (L.) (rapeseed), *B. rapa, Raphanus sativus* (L.) (radish), and *Sinapsis alba* (L.) (white mustard). Also preferred are etiolated seedlings of Brassica species.

One of skill in the art would recognize that the seedlings of the invention may vary in terms of the rate of metal accumulation, depending on a variety of factors. These factors include the ratio of soluble to insoluble metal in the metal-containing aqueous solution, the type of metal-containing aqueous solution, the total metal concentration, pH, organic matter content, and temperature.

EXAMPLE 2

In another embodiment of the methods of the invention, contained biomasses of a variety of plant species independently depleted metals in a metal-containing aqueous solution. In particular, *B. napus* (cv. unknown), *B. napus* (cv. Westar), *B. rapa* (cv. unknown), *B. rapa* (cv. Tobin), *B. juncea* (cv. Oriental), *B. juncea* (cv. Lethridge 22A), *Medicago sativa*, and *Oryzae sativa* were tested. Initially, 250 mg of seeds from each of the tested species were separately exposed to 800 ml of deionized water in 1 liter plastic beakers (approximately pH 5.5) at 22°–25° C. The seed-containing aqueous compositions were aerated using sparging stones connected to laboratory air pumps. Seedlings were allowed to develop in the beakers for seven days (except the rice seedlings, which were grown for 12 days in tap water), with the water in each beaker being replaced at the end of day 3. On day 7, seedlings were separately transferred to large plastic tubs. Each tub contained 10 liters of a solution of metals as described in Example 1. Seedlings were incubated in the solution of metals with continuous aeration for 48 hours in the dark at a temperature of 22°–25° C. Each solution of metals was replaced with a fresh solution of metals after 24 hours.

After 48 hours total exposure to the metals, the seedlings of each tested plant species were separately removed and placed in paper envelopes. The separated seedlings were then treated as described in Example 1. The metal cation content of the seedlings is presented in Table 1; the metal, and metalloid, anion content of the seedlings is presented in Table 2. The data in Tables 1 and 2 are presented in terms of bioaccumulation coefficients, as described in Example 1.

TABLE 1

| Plant species | Metals | | | | | | |
| --- | --- | --- | --- | --- | --- | --- | --- |
| | Cd (II) | Co (II) | Cu (II) | Mn (II) | Ni (II) | Sr (II) | Zn (II) |
| *B. napus* (cv. unknown) | 4560 | 883 | 5962 | 941 | 1074 | 1835 | 2004 |
| *B. napus* (cv. Westar) | 5740 | 970 | 6867 | 1299 | 1214 | 2164 | 2469 |
| *B. rapa* (cv. unknown) | 5005 | 952 | 8032 | 963 | 1193 | 2177 | 2200 |
| *B. rapa* (cv. Tobin) | 5462 | 847 | 7284 | 1408 | 1079 | 2035 | 2474 |
| *B. juncea* (cv. Oriental) | 6163 | 938 | 9162 | 1480 | 1147 | 2079 | 2783 |
| *B. juncea* (cv. Lethridge 22A) | 6882 | 1137 | 9220 | 1546 | 1357 | 2440 | 3103 |
| *Medicago sativa* (cv. unknown) | 6505 | 713 | 7393 | 1653 | 1075 | 1952 | 2572 |
| *Oryzae sativa* (cv. M-9) | 228 | 60 | 1242 | 166 | 128 | 77 | 150 |

TABLE 2

| Plant Species | Metals | | |
|---|---|---|---|
| | As (III) | Cr (VI) | U (VI) |
| B. napus (cv. unknown) | 337 | 1242 | 2485 |
| B. napus (cv. Westar) | 739 | 2467 | 4481 |
| B. rapa (cv. unknown) | 865 | 2981 | 4732 |
| B. rapa (cv. Tobin) | 642 | 2245 | 3448 |
| B. juncea (cv. Oriental) | 856 | 3268 | 5752 |
| B. juncea (cv. Lethridge 22A) | 1072 | 3733 | 6423 |
| Medicago sativa (cv. unknown) | 1579 | 6278 | 14703 |
| Oryzae sativa (cv. M-9) | 320 | 551 | 2738 |

The data in Tables 1 and 2 show that the plant species vary in their capacity to accumulate the different metals. Variation across species is found in terms of the capacity to accumulate any given metal. In addition, a given plant species exhibits varying capacities to accumulate the different metals being tested. Beyond the variations, however, the data show that the Brassica, as a group, are capable of accumulating a wide variety of metals from metal-containing aqueous solutions.

EXAMPLE 3

*B. juncea* seeds were germinated by exposure to an aqueous composition comprising tap water. Subsequently, the developing seedlings were contacted with metal-containing tap water or metal-containing deionized water solutions. Using the conditions described in Example 1, *B. juncea* accumulated metals and concomitantly depleted metals in the metal-containing solutions as revealed in Table 3. The results shown in Table 3 are presented using bioaccumulation coefficients (defined in Example 1).

TABLE 3

| Metals and metalloids | Tap Water | Deionized Water |
|---|---|---|
| Cadmium (II) | 2000 | 2464 |
| Cobalt (II) | 272 | 633 |
| Copper (II) | 2178 | 4034 |
| Manganese (II) | 498 | 1063 |
| Nickel (II) | 440 | 721 |
| Strontium (II) | 534 | 1527 |
| Zinc (II) | 1270 | 1260 |
| Arsenic (III) | 224 | 2101 |
| Chromium (VI) | 475 | 4176 |
| Uranium (VI) | 2738 | 7598 |

EXAMPLE 4

Figure 4:
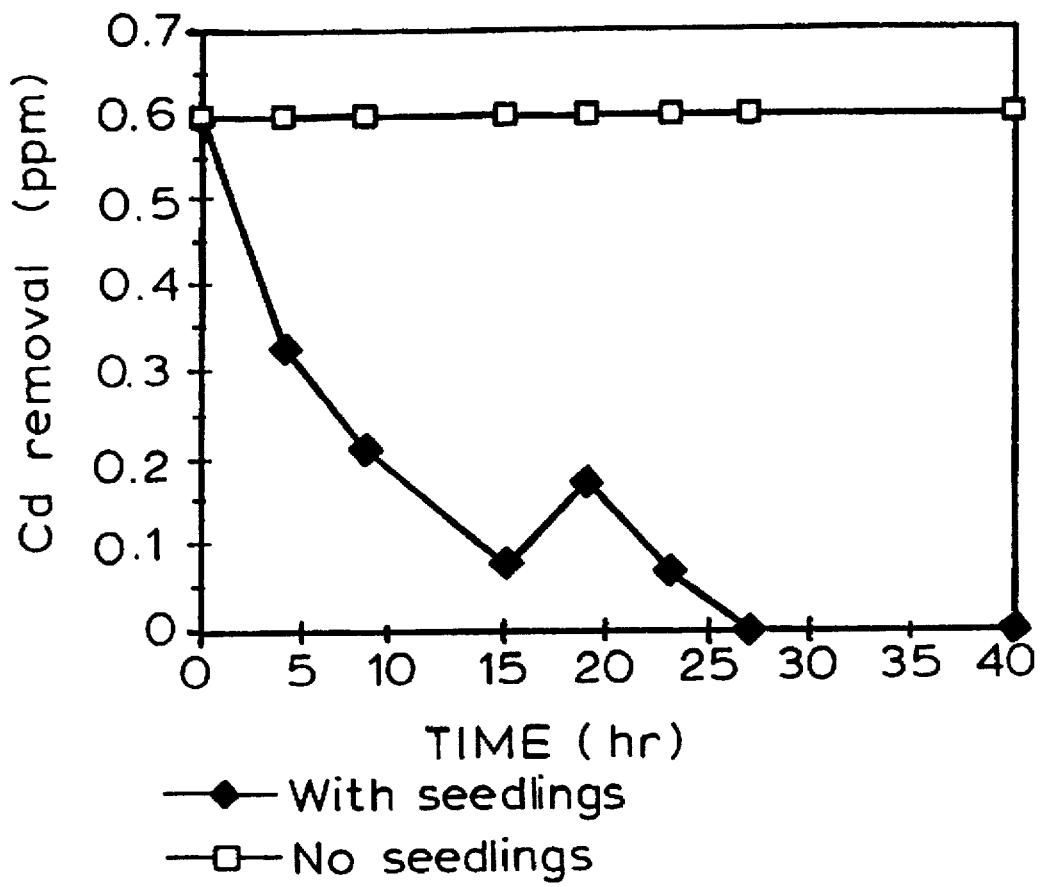
FIG. 4 graphically illustrates the depletion of aqueous cadmium by *B. juncea* seedlings over time.

Contained biomasses of *B. juncea* seedlings were used to deplete cadmium from a solution of aerated water. Initially, seeds were exposed to an aqueous composition. Following seed germination, the seedlings were allowed to develop for six days. At that point, 4.5 kilograms of *B. juncea* seedlings were contacted with 20 gallons of an aerated water solution containing cadmium at 0.6 ppm. The cadmium concentration in the water solution was then sampled at intervals over the next 27 hours, as indicated in FIG. 4. Apparent from FIG. 4 is the constant concentration of cadmium in fluid lacking seedlings. FIG. 4 also shows that 4.5 kilograms of 6-day-old seedlings in 20 gallons of metal-containing water reduced the cadmium concentration from 0.6 ppm to less than 1 part per billion in 27 hours. That performance by *B. juncea* seedlings translates into a greater than 600-fold reduction in aqueous cadmium by *B. juncea* seedlings present at 59.5 grams/liter.

EXAMPLE 5

Another embodiment of the invention contemplates methods for the remediation of metal-containing solutions using dead or inviable plant seedlings. Initially, seedlings (*B. juncea* cv. Lethridge 22A) were germinated and grown in tap water in the dark at 22° C. for 7 days with constant aeration. The biomass of seedlings was then divided into two groups. One group of seedlings was killed by drying at 55° C. for 24 hours. Each group of seedlings was then separately transferred to large plastic tubs. Each tub contained 10 liters of a solution of metals, as defined in Example 1. Each group of seedlings was incubated for 24 hours at 22° C. in the dark. The pH of the solution of metals prior to addition of the seedlings ranged from 6.0–6.5 and did not change during the course of the experiment. Following contact with the solution of metals, seedlings were removed, placed in separate paper envelopes, and dried for 24–48 hours at 80° C. Dried seedlings were then transferred to 50 ml glass digestion tubes and 5 ml of concentrated nitric acid was added. Samples were incubated for 6 hours at room temperature. Subsequently, the samples were incubated for 20 minutes at 180° C. After the samples had cooled, 1 ml of concentrated perchloric acid was added and the samples were again incubated for 20 minutes at 180° C. Deionized water was then added to bring the final volume to 25 ml. Samples were analyzed by Inductively coupled Plasma Spectroscopy using a Fisons Accuris E system. The data are presented in Table 4 as mean bioaccumulation coefficients (three trials), with standard deviations noted parenthetically.

TABLE 4

| Metals and Metalloids | Live Seedlings | Dead Seedlings |
|---|---|---|
| Arsenic (III) | 211 (±27) | 119 (±80) |
| Cadmium (II) | 765 (±111) | 1326 (±217) |
| Cobalt (II) | 133 (±15) | 185 (±28) |
| Chromium (VI) | 447 (±139) | 957 (±54) |
| Copper (II) | 2185 (±226) | 7504 (±698) |
| Manganese (II) | 226 (±21) | 273 (±33) |
| Nickel (II) | 209 (±20) | 393 (±63) |
| Strontium (II) | 259 (±23) | 396 (±59) |
| Uranium (VI) | 1521 (±196) | 5010 (±568) |
| Zinc (II) | 403 (±60) | 605 (±76) |

EXAMPLE 6

Figure 5:
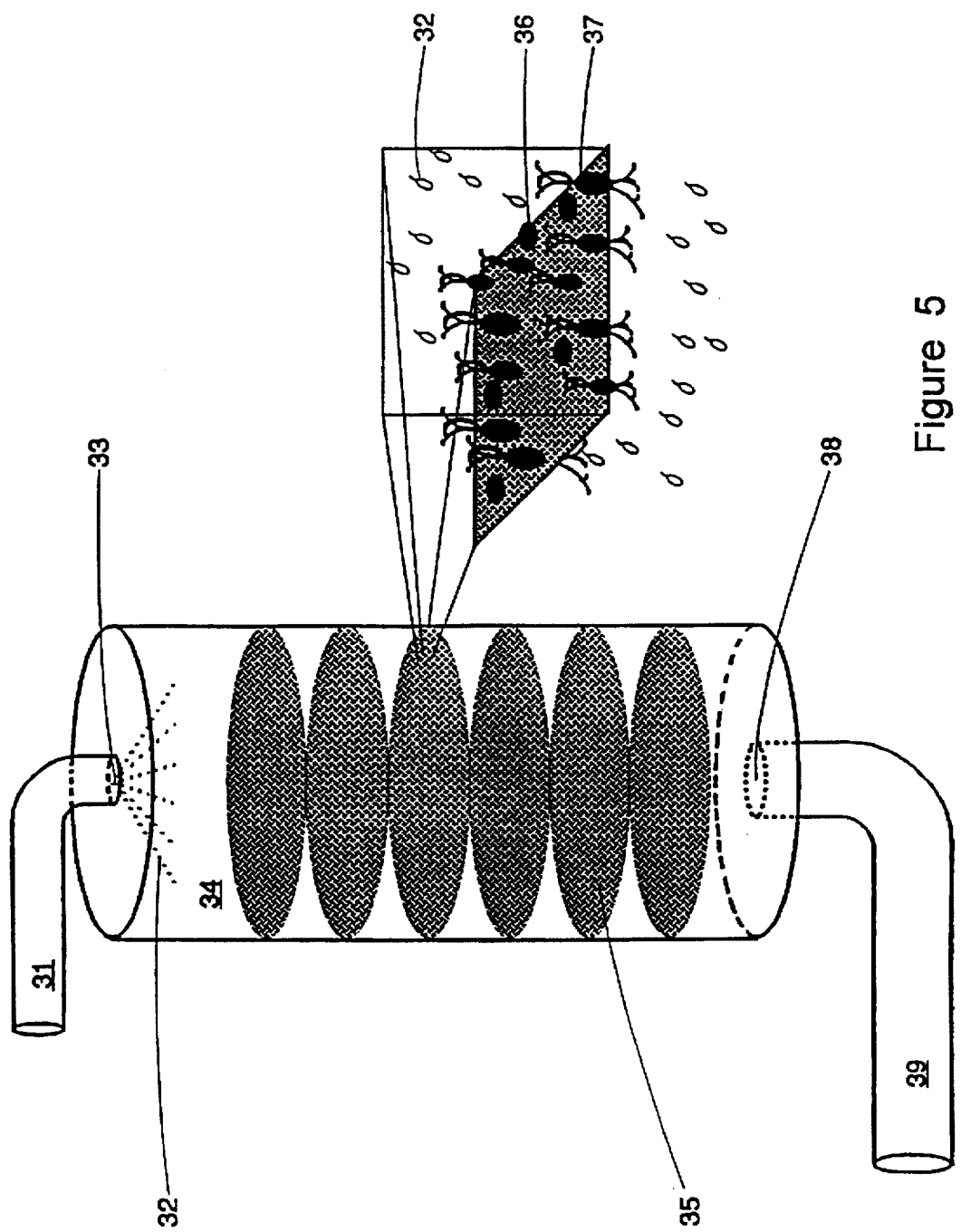
FIG. 5 is a schematic side elevational view of an apparatus for use in a system designed to deplete metals from metal-containing aqueous solutions.

Another embodiment of the invention comprehends a system for the depletion of metals to effect the remediation of metal-containing aqueous environments. FIG. 5 illustrates an apparatus for use in this type of system. The apparatus comprises an inlet tube 31 for conducting a metal-containing solution 32, which tube terminates at an inlet element 33 (e.g., spray nozzle) to a chamber 34. The metal-containing solution 32 is introduced into the chamber 34 in the form of a controlled flow. Porous screen elements 35 are disposed within the chamber 34 to form a variable number of approximately parallel shelf-like supports for seeds 36 and seedlings 37. The seeds 36 and seedlings 37 are transferred into, and out of, the chamber 34 via chamber access means (not shown). The chamber 34 is filled with a gas such as oxygen or air. The wall or walls of the chamber 34 serve to contain the metal-containing solution 32 and the biomass of plant material comprising plant seeds 36 and seedlings 37. An outlet element 38 permits the metal-containing solution 32, and any other fluid, to be removed from the chamber 34 of the apparatus. The exiting fluid is channeled through an outlet tube 39. The exploded inset shows seeds 36 and seedlings 37 resting on the screen elements 35 within chamber 34. The metal-containing solution 32 contacts the biomass of plant seedlings 37 disposed on the screen elements 35.

One of ordinary skill in the art would appreciate that inlet tube 31 and outlet tube 39 can be made of various materials, for example copper, iron, galvanized metal, robber, or plastic. Further, the invention comprehends varying diameters of inlet tube 31 and outlet tube 39. Also, the cross-sectional areas of inlet tube 31 and outlet tube 39 may vary.

The skilled artisan will also realize that the flow of metal-containing solution 32 may vary from a fine mist to a continuous flow, and may be gravity-driven. In addition, screen elements 35 can be made of any material exhibiting pore dimensions compatible with the passage of fluids while providing retentive support for seeds 36 and seedlings 37. The materials of screen elements 35 need only be compatible with seed germination and exhibit useful resistance to degradation. As used herein, useful resistance is that degree of resistance to degradation necessary to achieve a positive economic return. A skilled artisan would recognize that the number of screen elements 35 contained within the apparatus may vary, depending on the demand for biomass and the requirement for fluid passage through the apparatus.

The chamber 34 is also composed of materials exhibiting a useful resistance to degradation caused by contact with the fluids and biomaterials of the invention. Further, one of ordinary skill in the art would recognize that a variety of materials may be used to construct the chamber 34. These materials may be opaque to light, translucent or transparent. For example, the materials for chamber 34 may be comprised of pure metals, alloys, or synthetic compositions (e.g., plastics). Preferably, the material will be opaque, thereby excluding light energy from the interior. Light exclusion is preferred to prevent the growth of undesirable organisms such as algae and organisms directly or indirectly dependent on algae; the absence of light also permits the development of a preferred biomass of etiolated seedlings for use in the systems according to the invention. The chamber 34 also may be fitted with a liner made from, for example, glass or resin. A skilled artisan would recognize that the choices of dimensions for chamber 34, in terms of size and shape, are matters of design.

The outlet element 38 also may be made from a variety of materials and can serve to regulate fluid outflow by virtue of its size or through affirmative control mechanisms. The skilled artisan will appreciate that seeds 36 may be loaded into the apparatus at varying density. Moreover, those seeds 36 may be loaded alone or with seedlings 37 of varying or uniform developmental age. One of ordinary skill in the art would realize that each of the screen elements 35 may be supplied with different densities of seeds 36; different densities of seedlings 37 as well as seedlings 37 of differing developmental ages may also be disposed on the individual screen elements 35. Additionally, one of skill in the art would recognize that the size, shape, placement and mode of operation of access means involve design choices.

In operation, the system provides for the placement of seeds 36 and, optionally, seedlings 37 on screen elements 35. In one embodiment of the invention, a plurality of screen elements 35 is used to form a contained biomass that is segregated into physically stratified portions. In another embodiment, a plurality of chambers, each corresponding to chamber 34, is incorporated in the system according to the invention. Metal-containing solution 32 is conducted to chamber 34 by inlet tube 31. Entry of metal-containing solution 32 into chamber 34 may be regulated in terms of flow and direction. The metal-containing solution 32 then contacts germinating seeds 36 and seedlings 37, passes through the pores of screen elements 35, and optionally contacts additional seedlings 37. Eventually, the metal-containing solution 32 is urged, for example by gravity, to outer element 38. The metal-containing solution 32 is directed from outlet element 38 by outlet tube 39, where the metal-containing solution 32 may be subjected to additional processing in accordance with the invention. Ultimately, the metal-containing solution 32 is released from the system of the invention.

EXAMPLE 7

In another embodiment, the invention comprehends a system for the depletion of metals from metal-containing solutions comprising an apparatus as depicted in FIG. 5. Flow of the metal-containing solution 32 through the apparatus is discontinuous. The flow would reflect the controlled, discrete aqueous flows associated with a plugged flow design (involving a plurality of sequentially connected units, or apparatus) or batch-processing approach to remediation. As described in Example 6, a plurality of screen elements 35 may be used to segregate the contained biomass into physically stratified portions.

The apparatus, biomaterials, and operation of the system are as described in Example 6, with the following modifications. Entry of the metal-containing solution 32 into chamber 34 is controlled such that the flow of the metal-containing solution 32 into chamber 34 may be discontinuous. Also, outflow of the metal-containing solution 32 through outlet element 38 is controllable to ensure that the flow of the metal-containing solution 32 through outlet element 38 and into outlet tube 39 may be discontinuous. As will be understood in the art, adjustments to the flow of the metal-containing solution 32 will be based, in part, on either the metal absorbing capacity of the seedlings 37 in the chamber 34 or the desired level of metal to be removed from the metal-containing solution 32. Subsequently, the biomass is harvested via access means (not shown) and subjected to final metal recovery techniques known in the art.

EXAMPLE 8

Figure 6:
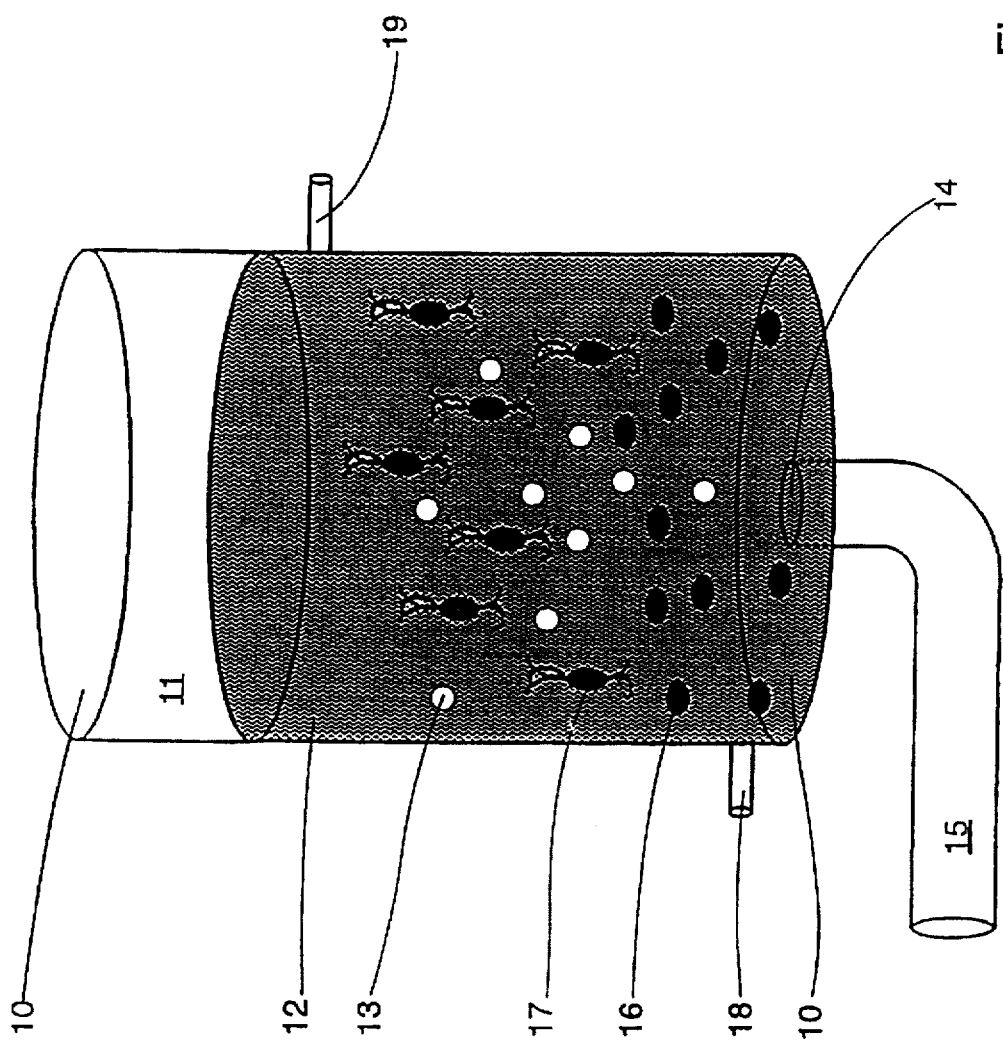
FIG. 6 is a schematic side elevational view of an alternative apparatus for a system according to the invention.

Another embodiment of the invention comprehends a system comprising an apparatus containing immersed or submerged seeds and seedlings to effect the depletion of metals from metal-containing aqueous solutions. FIG. 6 presents an apparatus for use in this type of system. The apparatus has an end plate 10 disposed at each end of a chamber 11. A metal-containing solution 12 is contained within the chamber 11. Gas 13, for example air or oxygen, is dispersed within the metal-containing solution 12 to provide aeration and to mix the contents of the chamber. A gas inlet 14 controls entry of the gas 13 into the chamber 11. The gas is supplied via gas inlet tube 15. Seeds 16 and seedlings 17 are dispersed within the metal-containing solution 12. An inlet tube 18 permits entry of the metal-containing solution 12 into the chamber 11. An outlet tube 19 and the inlet tube 18 are disposed on one or more walls of the chamber 11 in a manner that provides one means for controlling the level of the metal-containing solution 12 in the chamber 11.

In addition to the understanding of one of skill in the art set out in Example 6, the skilled artisan would appreciate that the degree to which the chamber 11 is filled with the metal-containing solution 12 may be varied. Moreover, the amount of the metal-containing solution 12 in the chamber 11 may be controlled by relative placement of the inlet tube 18 and outlet tube 19 or by a flow control device attached to inlet tube 18 or outlet tube 19. Further, the skilled artisan would appreciate that the metal-containing solution 12 flow may be continuous. Additionally, screens serving to retentively support the seeds 16 and seedlings 17 may be positioned in chamber 11 and may also serve to control the flow of the metal-containing solution 12. Also, an end plate 10 may be separated from the chamber 11 to facilitate loading and unloading of the biomass.

To operate the system in accordance with the invention, biomass in the form of seeds 16 and, optionally, seedlings 17 are initially loaded into the chamber 11 of the apparatus, as shown in FIG. 6. The loading may be accomplished by removing end plate 10 of chamber 11. End plate 10 may then be re-engaged with the walls of chamber 11, effecting a fluid-tight seal. A metal-containing solution 12 is then introduced into chamber 11 via inlet tube 18. The flow of the metal-containing solution 12 may be continuous. Routine experimentation may be used to adjust the flow rate of the metal-containing solution 12 to ensure that a desired quantity of metal is removed from the metal-containing solution 12 by the contained biomass. Flow control techniques well known in the art may be used. Gas 13 is also introduced into chamber 11. Control of gas 13 entry into chamber 11 is achieved by gas inlet 14. The gas 13 may promote biomass development and may facilitate the biomass-mediated depletion of metals from the metal-containing solution 12. The metal-containing solution 12 eventually exits the apparatus via outlet tube 19, where it may be exposed to additional rounds of biomass-mediated metal removal, or released. The biomass is then unloaded through, for example, access means that may involve removal of an end plate 10. The harvested biomass is then subjected to final metal recovery techniques known in the art. A plurality of biomass-containing apparatus may be sequentially connected to increase the metal-removing capacity of the system.

EXAMPLE 9

Figure 7:
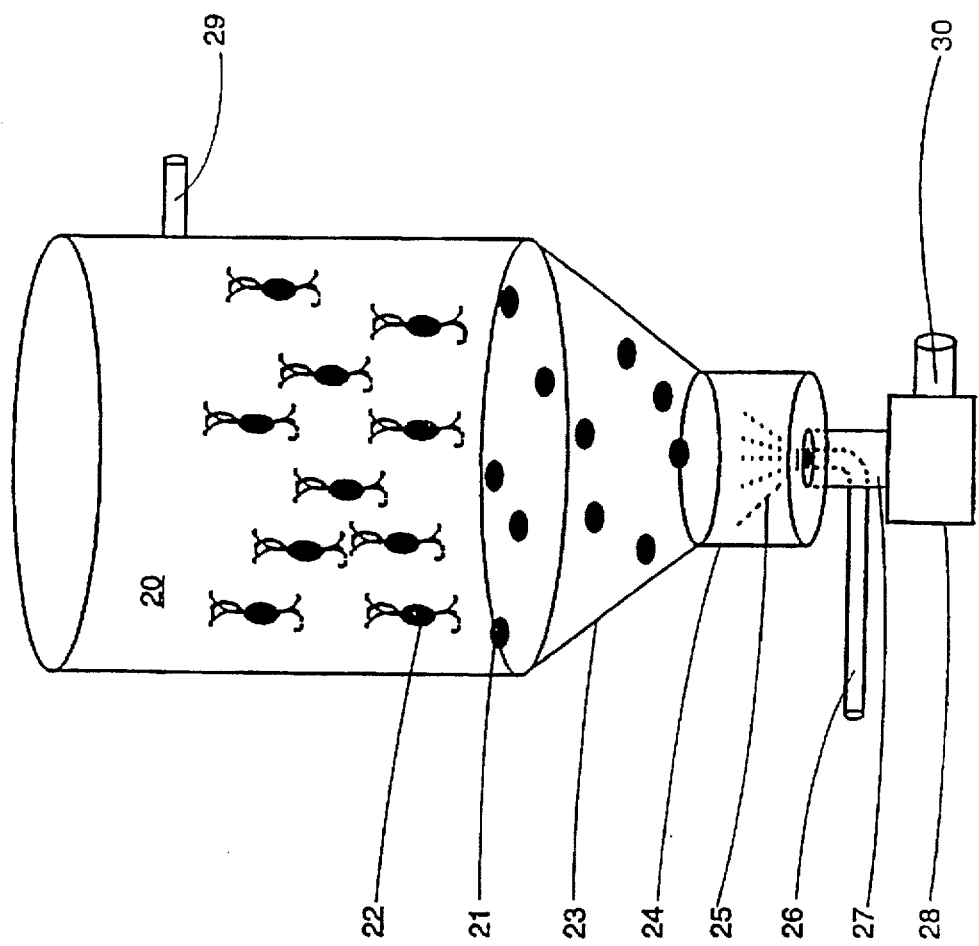
FIG. 7 is a schematic side elevational view of a further alternative apparatus for a system according to the invention.

In another embodiment of the invention, a system for depleting the metals in a metal-containing aqueous solution comprises a fluidized bed apparatus. FIG. 7 illustrates an apparatus for use in this type of system. An upper chamber 20 contributes to the containment of seeds 21 and seedlings 22. An intermediate chamber 23 provides a structural transition between the larger cross-sectional area of upper chamber 20 and the smaller cross-sectional area of lower chamber 24. Transfer of biomass into, and out of, the apparatus is facilitated by access means (not shown). A flow of a metal-containing solution 25 is introduced into lower chamber 24 from fluid inlet tube 26. Gas, for example air or oxygen, is introduced under positive pressure from gas inlet tube 27. An air pump 28 pressurizes the gas. An outlet tube 29 provides a means for the outflow of fluid and gas. A gas supply tube 30 conducts the gas to the air pump 28.

One of skill in the art will recognize that the design of the apparatus can vary. For example, a cylindrical apparatus is within the scope of the invention to the extent that either the fluid or gas entry designs can maintain a fluidized bed. Similarly, the apparatus may be opaque, translucent, or transparent. Preferably, the apparatus will be opaque to prevent the growth of undesirable light-requiring organisms and permit the use of etiolated seedlings, a preferred biomass. The apparatus can be made of metal, plastic, or other synthetic or natural compounds. The access means (not shown) may also vary in size, shape, and mode of operation. Fluid inlet tube 26, outlet tube 29, gas inlet tube 27, and gas supply tube 30 may vary in composition and design, provided their functions in channeling and directing materials are not lost. The air pump 28 may also vary in size, shape, capacity, and energy source. In terms of the biomass, the seeds 21 and seedlings 22 may represent one or more species of seed-bearing, metal-accumulating plants.

In operation, the system involves the containment of a biomass by the initial placement of the biomass in the apparatus, using an access means. Gas is introduced under pressure from gas inlet tube 27. The gas suspends the seeds 21 and seedlings 22 throughout the enclosed volume of upper chamber 20, intermediate chamber 23, and lower chamber 24. Metal-containing solution 25 enters the enclosed volume via fluid inlet tube 26. Gas entering through gas inlet tube 27 contacts and disperses the metal-containing solution 25. The dispersed metal-containing solution 25 contacts the entirety of seedlings 22, allowing the biomass to remove metal from the metal-containing solution 25. Subsequently, the metal-containing solution 25 is urged out of the apparatus by gas pressure; the metal-containing solution 25 exits through outlet tube 29. The metal-containing solution 25 may be subjected to additional rounds of metal removal in accordance with the invention, or be released. To recover metal-containing biomass, the flows of gas and metal-containing solution 25 may be interrupted and the biomass harvested via an access means. The biomass is then subjected to final metal recovery by techniques known in the art. A plurality of biomass-containing apparatus may be sequentially connected to increase the metal-removing capacity of the system.

EXAMPLE 10

Another embodiment of the present invention relates to a biomass developed from plant material that has been mutagenized or genetically engineered. Mutagenesis may be effected by ethylmethane sulfonate (EMS) using techniques that are known in the art. The alkylation of nucleotides by EMS causes DNA nucleotide mispairings memorialized in permanent point mutations. See e.g., Redei, G., in Genetic Manipulations of Higher Plants, (L. Ledous ed., 1975). EMS has been used in selection programs to produce heritable changes in plant genes.

Mutagenesis may be accomplished by exposing dry, or pre-soaked, seeds to EMS in solution at room temperature. Approximately 1.0 g and 5.4 g of *B. juncea* 426308 seeds are placed in two 400 ml plastic beakers. Next, 10 ml of a 0.1M phosphate buffer (3:2 ratio of 0.1M $Na_2HPO_4$:0.1M $KH_2PO_4$, pH 6) is added to the container with 1.0 g of seeds and 54 ml of the same buffer is added to the container with 5.4 g of seeds. Both beakers are incubated in a rotating incubator set to 150 rpm and room temperature for 3 hours. The buffer in each beaker is replaced with fresh phosphate buffer and, in a fume hood, EMS is added to a final concentration of 160 mM for the beaker containing 5.4 g of seeds (Sigma Chemical Co., St. Louis, Mo., catalog number M-0880). One of ordinary skill in the art will recognize that concentrations of EMS effective in mutagenesis will vary, depending, for example, on the duration of seed pre-soaking, the duration of seed exposure to EMS, and temperature. A preferred concentration of EMS is that concentration resulting in approximately 50% seed viability, as determined by routine experimentation.

The 5.4 g of seeds being treated with EMS is the experimental material; the 1.0 g of seeds serves as a negative control. The beakers are incubated for 6 hours at 25° C. on a rotating incubator set at 150 rpm. The EMS solutions are then decanted and the hazardous waste is discarded in a safe manner. The seeds are rinsed with water 4–5 times in the fume hood. Subsequently, the beakers are covered with cheesecloth and thoroughly rinsed in running water for a minimum of 2 hours. The seeds are then dried and sown in 64 cavity seed trays with 1 seed per cavity. Frequent watering should yield approximately 50% seedlings. This M1 generation of plants is allowed to grow to maturity and self-fertilized. The progeny or M2 seedlings are screened for metal tolerance in aqueous solutions containing various metal concentrations. The most tolerant M2 plants, those growing most vigorously, are analyzed for metal accumulation.

A screening system is used to identify terrestrial plant species with the highest metal accumulating potential, as revealed by bioaccumulation coefficients, defined in Example 1. These plants may then be self-fertilized, and pure-breeding plant lines established.

EXAMPLE 11

Another embodiment of the present invention contemplates a method and system involving a seedling biomass developed from plant material that has been genetically manipulated using well-established techniques for gene transfer. An increase in metal uptake is effected by introducing a gene facilitating metal accumulation into a biomass used in accordance with the invention. Suitable genes include heterologous phytochelatin- or metallothionein-encoding genes. A variety of organisms respond to metals by production of metallothioneins (MTs), low molecular weight proteins encoded by structural genes. See e.g., Maroni, *Animal Metallothioneins*, pages 215–232 in Heavy Metal Tolerance in Plants: Evolutionary Aspects, 215–232 (A. Shaw ed., 1990). Using techniques well known in the art, a DNA fragment encoding an MT is cloned into, for example, an Agrobacterium-based plant transformation/expression vector such as pJB90, a derivative of pGSFR780A. See De Block et al., *Physiol. Plant.* 91:694–701 (1989).

Following the cloning of an MT gene into a suitable DNA vector, the recombinant DNA vector encoding the MT must be introduced into the plant line from which the biomass will be obtained. To accomplish the transfer, the natural plant-infecting property of *A. tumefaciens* is exploited. Biomass tissue is incubated in the presence of a suspension of *A. tumefaciens* cells carrying the recombinant vector encoding the MT. The tissue is allowed to grow and, after several days, the regenerating biomass is transferred to selection medium and further incubated. This results in selection for antibiotic resistance, typically conferred on the biomass by the recombinant vector also encoding the MT. Consequently, the selection process typically yields a biomass concomitantly capable of expressing the MT gene and the antibiotic resistance marker.

The transformants are analyzed for the presence of MT-encoding DNA by Southern analysis using techniques standard in the art. Additionally, the expression of the vector-borne MT gene can be investigated by Northern analysis to assess whether mRNA is being produced. For both Southern and Northern analyses, cloned copies of the mammalian MT genes used for plant transformation are available as probes. Lefebvre, *Plant Physiol.* 93:522–524 (1990); Malti et al., *Plant Physiol.* 91:1020–1024 (1989). The transformants are also analyzed for expression of MT protein by Western or immunoblot analysis with antisera recognizing mammalian MT. Chatterjee et al., *Mol. and Cell. Biochem.* 94:175–181 (1990). Sambrook et al., Molecular Cloning: A Laboratory Manual (1989), incorporated herein by reference, and Harlow et al., Antibodies: A Laboratory Manual (1988), incorporated herein by reference, describe techniques that are standard in the art.

Sexual and asexual (i.e., somatic) hybridization constitute additional approaches to the introduction of genes capable of altering a metal-accumulating trait of a seed-bearing plant. Hybridization has been used to transfer agronomically important traits from related species to commercially valuable members of the Brassicaceae. See, e.g., Salisbury et al., *Genetics Life Sci. Adv.* 8:65–87 (1989), incorporated herein by reference.

While the present invention has been described in terms of specific embodiments, it is understood that variations and modifications will occur to those skilled in the art. Accordingly, only such limitations as appear in the appended claims should be placed on the invention.

We claim:

1. A method to effect a depletion of metal in a metal-containing solution which comprises the following steps:
   (1) forming a contained biomass of etiolated metal-accumulating plant seedlings for contact with said solution, said seedlings not requiring external nutrients or external energy in the form of light or heat in excess of requirements to achieve normal germination temperatures prior to or during contact with a metal-containing aqueous solution;
   (2) contacting said contained biomass of plant seedlings with a metal-containing solution for a time period sufficient to permit accumulation of metals by said seedlings and corresponding depletion of metals from said solution; and
   (3) separating plant seedlings having accumulated metal from said solution.

2. The method according to claim 1 wherein said plant seedlings do not require external energy.

3. The method according to claim 1 wherein during said contacting step (2) said contained biomass of plant seedlings is immersed in said metal-containing solution.

4. The method according to claim 1 wherein during said contacting step (2) said contained biomass of plant seedlings is aerated.

5. The method according to claim 4 wherein during said contacting step (2) said contained biomass of plant seedlings is mixed with said metal-containing solution.

6. The method according to claim 1 wherein said biomass forming step (1) comprises disposing plant seeds in a contained aerated aqueous environment to germinate said seeds.

7. The method according to claim 6 wherein said contained environment comprises said metal-containing solution, whereby said biomass forming step (1) and contacting step (2) are temporally coincident.

8. The method according to claim 1 wherein the contained biomass used in said contacting step (2) is a biomass of seedlings which has been rendered non-viable.

9. The method according to claim 1 wherein said contacting step (2) comprises flowing said metal-containing solution through said contained biomass.

10. The method according to claim 9 wherein flowing said metal-containing solution is effected by gravity.

11. The method according to claim 9 wherein said flowing is discontinuous.

12. The method according to claim 1 wherein said biomass is selected from the group consisting of seedlings of *Brassica napus, Brassica rapa, Brassica juncea, Medicago sativa,* and *Oryzae sativa* seeds.

13. The method according to claim 1 wherein said metal is selected from the group consisting of elemental or ionic Arsenic, Cadmium, Cesium, Chromium, Cobalt, Copper, Lead, Manganese, Nickel, Selenium, Strontium, Uranium and Zinc.

14. The method according to claim 1 wherein said contacting step (2) further comprises aerating said metal-containing solution when in contact with said biomass.

* * * * *

UNITED STATES PATENT AND TRADEMARK OFFICE
CERTIFICATE OF CORRECTION

PATENT NO.   :   5,728,300
DATED        :   March 17, 1998
INVENTOR(S)  :   Kapulnik et al.

It is certified that error appears in the above-identified patent and that said Letters Patent is hereby corrected as shown below:

Col. 11, line 14:   After "...galvanized metal", delete "robber", and insert - -rubber- -.

Col. 12, line 13-14:   After "...gravity, to", delete "outer", and insert - -outlet- -.

Signed and Sealed this

Eleventh Day of July, 2000

Attest:

Q. TODD DICKINSON

*Attesting Officer*      *Director of Patents and Trademarks*